(12) United States Patent
Hall

(10) Patent No.: US 9,161,566 B2
(45) Date of Patent: Oct. 20, 2015

(54) PLANT PROCESSING SYSTEM AND METHOD

(75) Inventor: Peter Ryan Hall, Vancouver (CA)

(73) Assignee: PAOLO DEVELOPMENTS LTD., Road Town, Tortola (VG)

( * ) Notice: Subject to any disclaimer, the term of this patent is extended or adjusted under 35 U.S.C. 154(b) by 54 days.

(21) Appl. No.: 14/116,595

(22) PCT Filed: May 11, 2012

(86) PCT No.: PCT/CA2012/050312
§ 371 (c)(1),
(2), (4) Date: Nov. 15, 2013

(87) PCT Pub. No.: WO2012/151706
PCT Pub. Date: Nov. 15, 2012

(65) Prior Publication Data
US 2014/0087794 A1    Mar. 27, 2014

(30) Foreign Application Priority Data

May 11, 2011    (CA) ...................................... 2740149

(51) Int. Cl.
*B02C 25/00*    (2006.01)
*A23N 15/00*    (2006.01)
*A23N 15/02*    (2006.01)
*A23N 15/06*    (2006.01)
*B26D 1/36*    (2006.01)
*A01G 3/00*    (2006.01)

(52) U.S. Cl.
CPC *A23N 15/00* (2013.01); *A01G 3/00* (2013.01); *A23N 15/02* (2013.01); *A23N 15/06* (2013.01); *B26D 1/36* (2013.01)

(58) Field of Classification Search
CPC ..... A01D 45/006; A01D 45/008; A01G 3/08; A01G 17/00; A01G 3/00; A23N 15/02; A23N 15/025; A23N 15/12; A23N 15/00; A23N 15/06; B26D 1/36
USPC ................... 99/636, 637, 639; 83/404.2, 440; 460/144, 113, 114, 133, 147–150, 8, 9, 460/123; 241/30, 60, 74, 81, 166, 167, 235
See application file for complete search history.

(56) References Cited

U.S. PATENT DOCUMENTS

| 1,103,305 A | 7/1914 | Lilliston |
| 1,336,991 A * | 4/1920 | Urschel ........................... 99/636 |
| 1,358,002 A * | 11/1920 | Lash ............................... 99/636 |
| 3,472,297 A | 10/1969 | Urschel et al. |
| 8,127,668 B2 * | 3/2012 | Snyder et al. ................... 99/636 |
| 8,757,524 B2 * | 6/2014 | Mosman ......................... 241/30 |
| 2009/0191928 A1 | 7/2009 | Snyder et al. |

FOREIGN PATENT DOCUMENTS

| CA | 2250592 A1 | 4/2000 |
| JP | 1231883 A | 9/1989 |

* cited by examiner

*Primary Examiner* — Robert Pezzuto
(74) *Attorney, Agent, or Firm* — Clement Cheng

(57) ABSTRACT

A plant processor, having: a) a rotatable drum for receiving plant matter, the rotatable drum having a plurality of slots; b) a rotatable cutting reel positioned below the rotatable drum, the cutting reel rotatable in the opposite direction of the drum; c) a cutting knife horizontally positioned below the top of the reel; the cutting knife maintained in position by one or more magnets, the cutting knife slidable along a slot in a frame of the processor by a rod extending above the knife; and d) a motor to rotate a shaft secured to the reel, the shaft having a groove to frictionally engage a ring, the ring supporting the drum, whereby rotation of the reel rotates the drum in the opposite direction.

13 Claims, 7 Drawing Sheets

PLANT PROCESSING SYSTEM AND METHOD

FIELD OF THE INVENTION

This invention relates to systems for removing extraneous material from plants, and more particularly to systems for removing such material from herbs, berries and medicinal crops.

BACKGROUND OF THE INVENTION

Current plant processing machines are inefficient, costly to clean and repair, and prone to breakdown. An improved plant processing system is desired.

SUMMARY OF THE INVENTION

In one aspect the present invention provides a plant processor, including: a) a rotatable drum for receiving plant matter, the rotatable drum having a plurality of slots; b) a rotatable cutting reel positioned below the rotatable drum, the cutting reel rotatable in the opposite direction of the drum; c) a cutting knife horizontally positioned below the top of the reel; the cutting knife maintained in position by at least one magnets, the cutting knife slidable along a slot in a frame of the processor by a rod extending above the knife; and d) a motor to rotate a shaft secured to the reel, the shaft having a groove to frictionally engage a ring, the ring supporting the drum, whereby rotation of the reel rotates the drum in the opposite direction.

In another aspect, the present invention provides a plant processor, including: a) a cylindrical rotatable drum for receiving plant matter, the rotatable drum having a plurality of slots and a ring at each end of the drum positioned coaxially with the drum; b) a cutting reel positioned below the rotatable drum and being rotatable in an opposite direction to the drum, the cutting reel comprising a cylindrical rod and a plurality of longitudinal cutting blades connected thereto, the cutting reel further including a shaft extending axially therefrom at each end, the shaft being in frictional engagement with said rings on the drum and said rings supporting the drum on the shaft; c) a cutting knife horizontally positioned below the top of the reel; and d) a motor to rotate the shaft and the reel and to effect rotation of the drum in the opposite direction as a result of the frictional engagement between the shaft and said rings.

In some embodiments, each of the rings may include an O-ring and the shaft may include pulleys each located adjacent an O-ring and having a circumferential groove that receives and frictionally engages a portion of the adjacent O-ring, and wherein the drum is supported on the O-rings.

In some embodiments, a drive belt may be provided that is connected to the motor and the shaft for imparting rotation to the reel, hence the drum. In some embodiments, the cutting knife may be maintained in position by at least one magnets to enable quick removal and replacement of the cutting knife.

In some embodiments, the cutting knife may be slidable along a slot in a frame of the processor by a knife adjusting rod cooperating with the knife.

Some embodiments may further include a bed bar defining a top surface on which the cutting knife is supported, wherein said magnets are recessed into the bed bar to be flush with the top surface.

GENERAL DESCRIPTION OF THE DRAWINGS

DETAILED DESCRIPTION OF THE INVENTION

Figure 1:
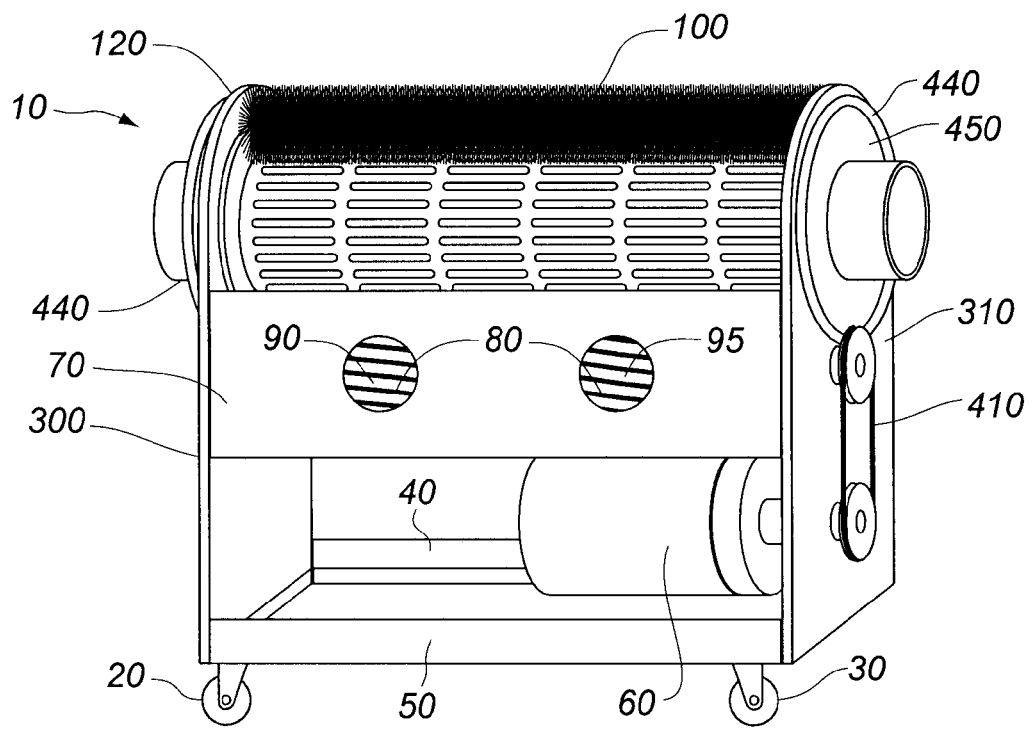
FIG. 1 is a front view of a plant processing apparatus according to the invention.
Figure 2:
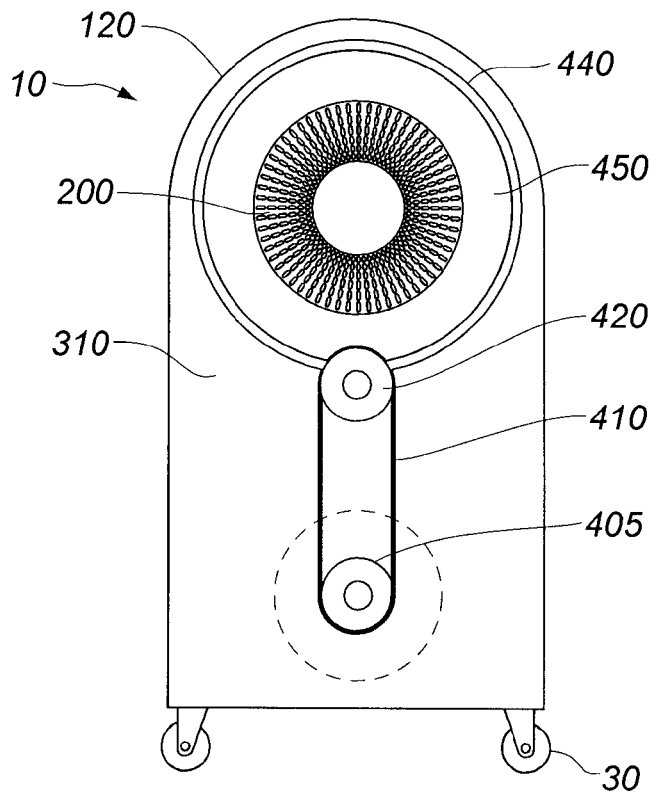
FIG. 2 is a side view thereof.

As seen in FIG. 1, plant processing apparatus 10 includes two pairs of wheels 20, 30. Wheels 30 may be slightly larger, or have a greater distance to base members 40, 50 to provide apparatus 10 a slight "tilt" to one side relative to the surface the machine 10 is placed on. Instead of wheels 20, 30, legs or other means to support apparatus 10 may be used.

Wheel pairs 20, 30 are secured to front and rear base members 40, 50. Base members 40, 50 support motor 60, which is conventionally powered, for example by means of a plug or battery. Front plate 70 is positioned above motor 60 and has two apertures 90, 95. Apertures 90, 95 are sized and shaped to receive a hose for a dust collector (not shown). When in contact with a dust collector a small vacuum is created in apparatus 10. Behind front plate 70 is a rotatable cutting reel 80. Cutting reel 80 has characteristics similar to that of a reel used in a hand operated lawn mower, and generally includes a horizontal cylindrical rod attachable to reel pulley 420 and a plurality of blades arranged around the rod, the blade supported by supports.

Drum 200 is positioned above reel 80 and at the top of drum 200 is brush 100 supported by upper frame 120. Drum 200 has a plurality of slots 110. Slots 110 are sized to either allow or prevent the wanted materials to pass through drum 200 through to cutting reel 80. Brush 100 is in contact with slots 110 when slots 110 are at the upper portion of their rotation, and prevents material from getting stuck in slots 110 or being flung by centrifugal force.

Figure 3:
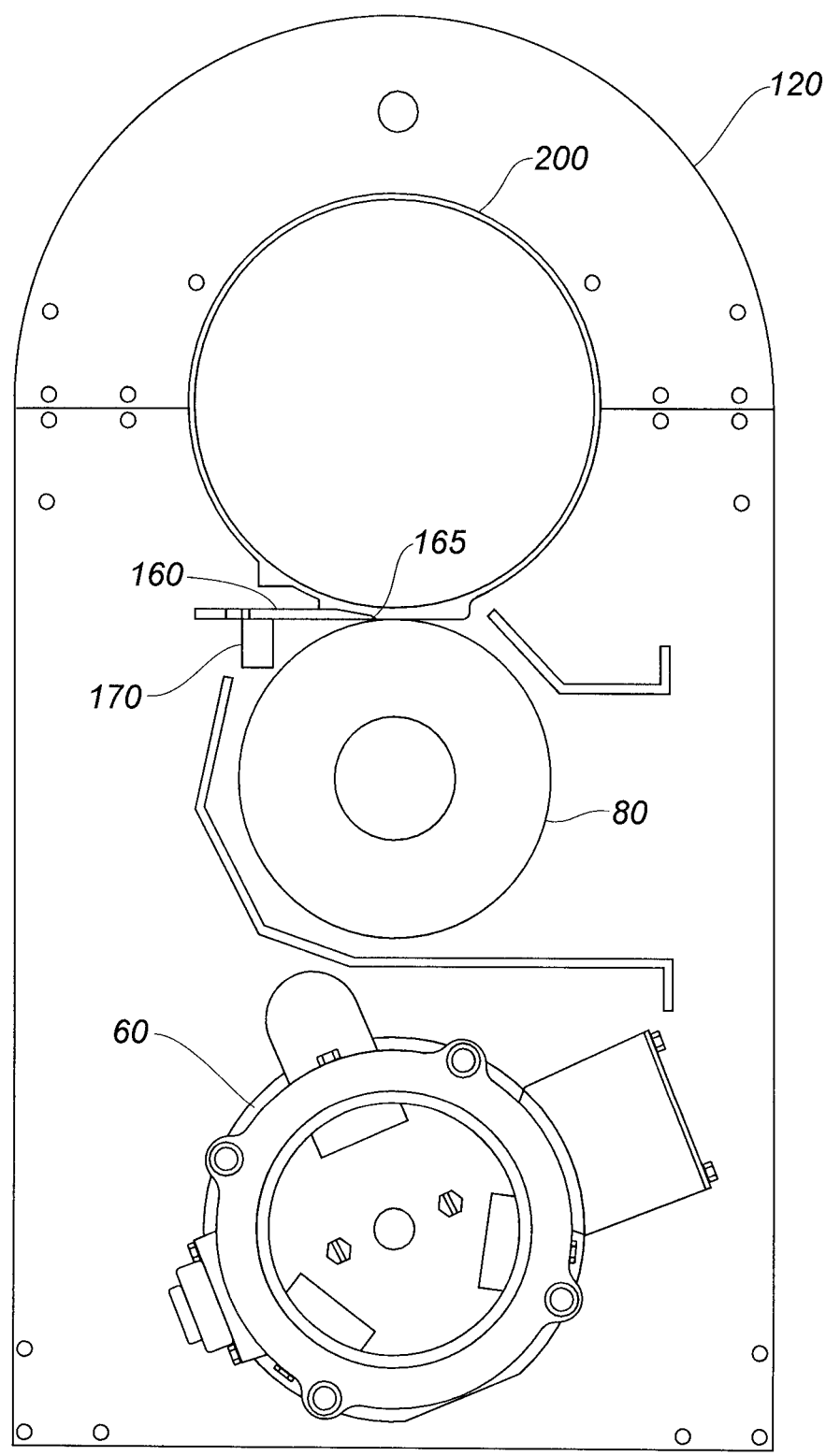
FIG. 3 is a cross sectional side view thereof.
Figure 8:
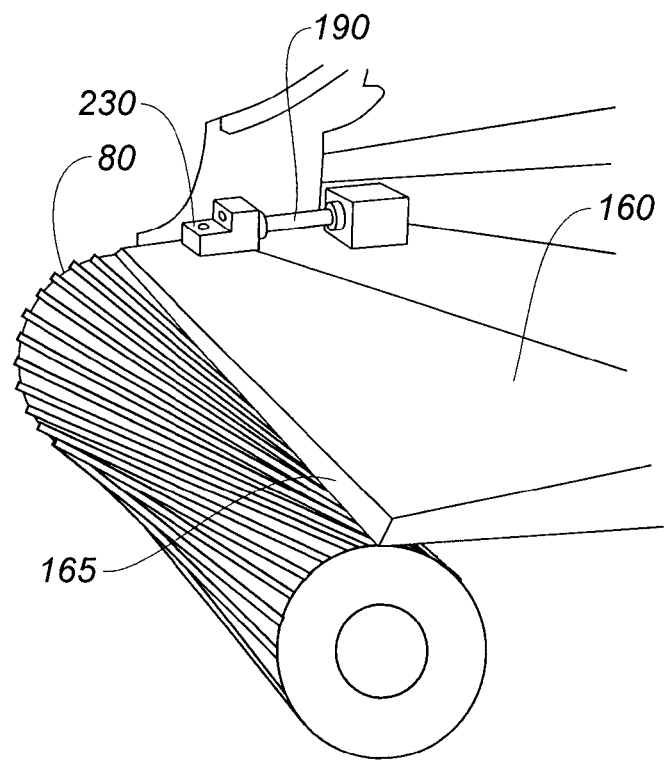
FIG. 8 is a perspective view of the cutting blade.

As seen in FIG. 3, between cutting reel 80 and drum 200 is a flat cutting blade 160. Cutting blade 160 is horizontally positioned such that the cutting edge 165 is just below the top of reel 80 as shown in FIG. 8. Reel 80 and drum 200 rotate in opposite directions.

Figure 9:
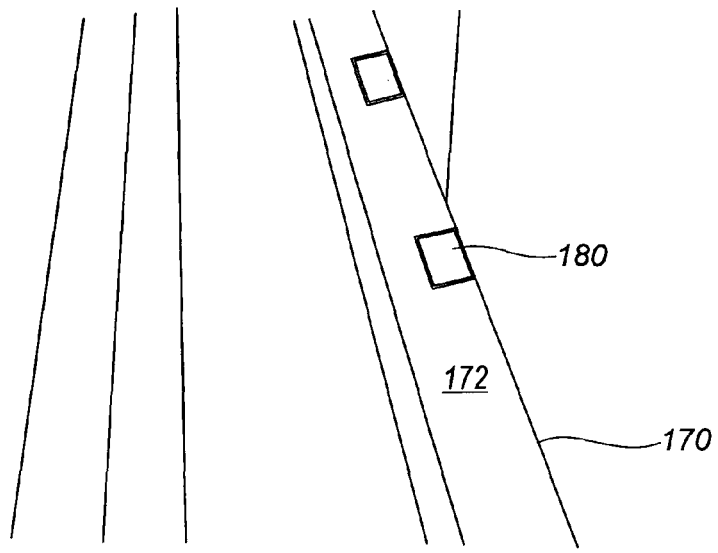
FIG. 9 is a view of the bed bar.
Figure 10:
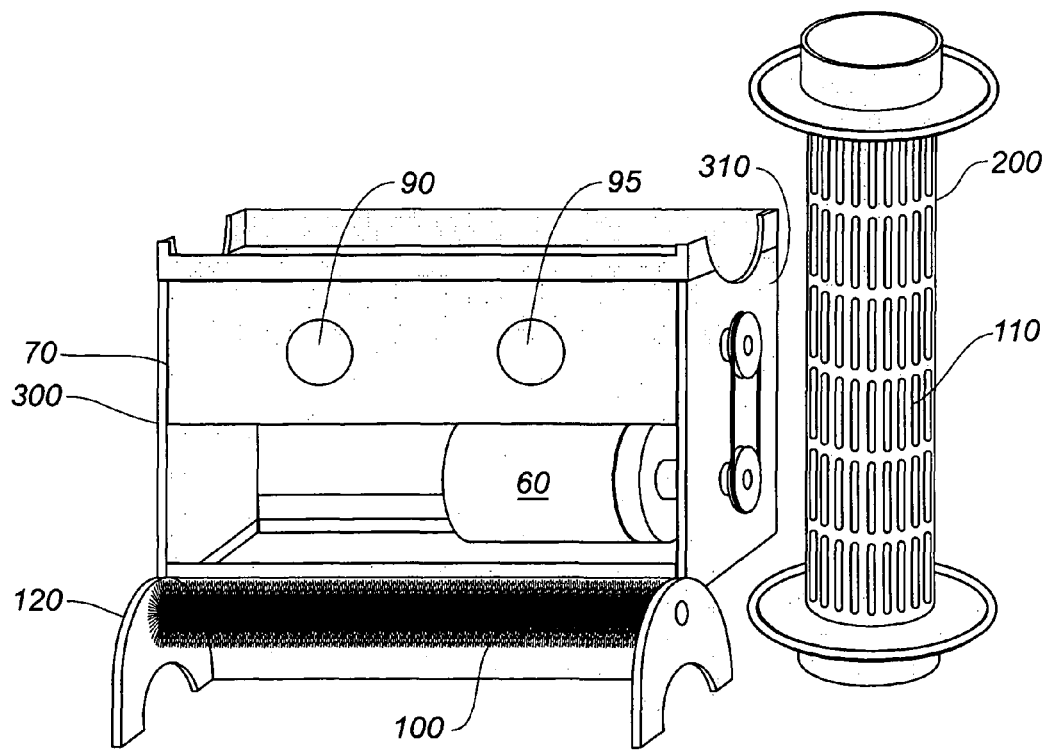
FIG. 10 is a disassembled front view of the apparatus.

Cutting blade 160 is held in place by bed bar 170 and slots 230 in side panels 300, 310 as well as screws (not shown) for additional support. Bed bar 170 has magnets 180 (such as rare earth magnets) on its top surface 172, as see in FIG. 9, that maintain blade 160 in position. Knife adjustment rod 190 can be used to adjust the horizontal position of blade 160 as it becomes worn and to move blade 160 laterally to compensate for different levels of wear along cutting edge 165. This arrangement allows blade 160 to be removed easily, sharpened and replaced.

Figure 4:
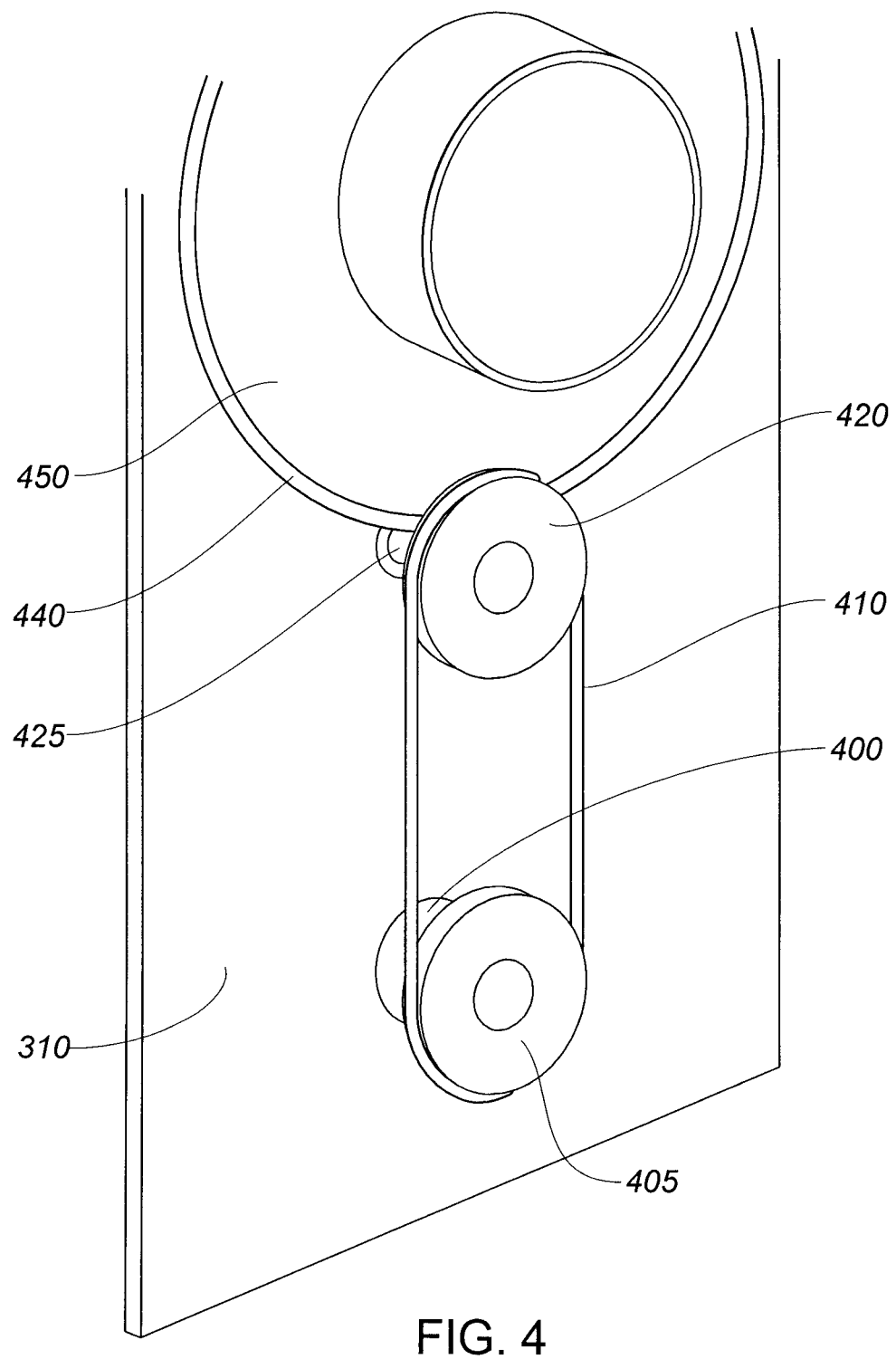
FIG. 4 is a perspective side view of the system showing the drive system therein.
Figure 5:
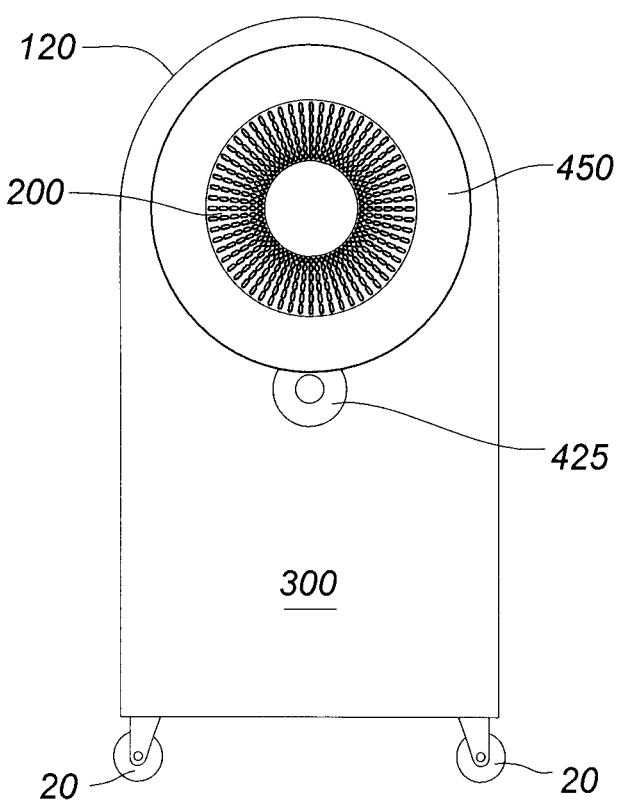
FIG. 5 is an alternate side view thereof.
Figure 6:
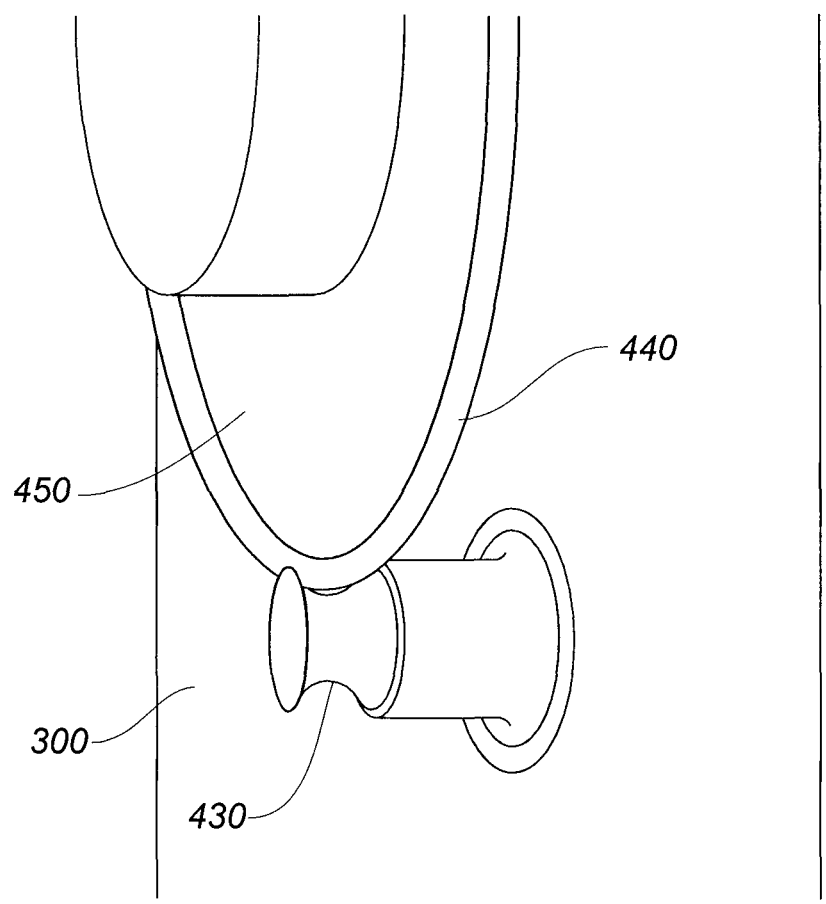
FIG. 6 is a view of the drive groove therein.
Figure 7:
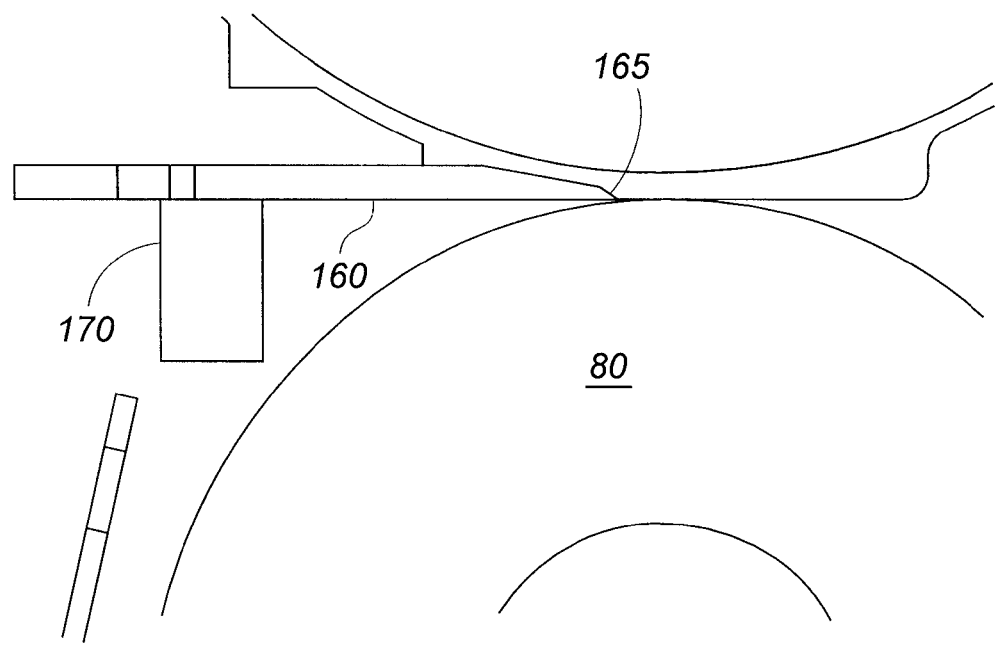
FIG. 7 is a side view showing the cutting blade and cutting reel.

As seen in FIGS. 4, 5, and 6, drive shaft 400 extends from motor 60, and rotates drive pulley 405 at the end of chive shaft 400. Drive belt 410 causes reel pulley 420 and reel shaft 425 to rotate, thereby rotating reel 80. Reel shaft 425 has groove 430 positioned between reel pulley 420 and side panel 310. Groove 430 is sized to receive o-ring 440 positioned on the circumference of ring 450. Ring 450 is sized to receive and hold drum 200. Therefore, by rotating reel shaft 425, ring 450 is caused to rotate, and drum 200 rotates thereby in the opposite direction of the rotation of reel 80.

As seen in FIGS. 5 and 6, on the opposite side 300, reel shaft 425 has groove 430 as described above.

When using apparatus 10, plant material, such as herbs, berries, medicinal marijuana, including leafs, stems and/or debris are fed into the rotating drum 200 from a first, elevated side 120. The plant material is drawn to the lower portion of drum 200, through a slot 110 (if such material can fit through slot 110) and is cut by blade edge 165 and reel 80.

Plant material falling into reel 80 is drawn through aperture 90 or 95 and into a dust collector, where it can be retrieved later.

The above-described embodiments have been provided as examples, for clarity in understanding the invention. A person of skill in the art will recognize that alterations, modifications and variations may be effected to the embodiments described above while remaining within the scope of the invention as defined by the claims appended hereto.

I claim:

1. A plant processor, comprising:
    a) a cylindrical rotatable drum for receiving plant matter, the rotatable drum having a plurality of slots and a ring at each end of the drum positioned coaxially with the drum;
    b) a cutting reel positioned below the rotatable drum and being rotatable in an opposite direction to the drum, the cutting reel comprising a cylindrical rod and a plurality of longitudinal cutting blades connected thereto, the cutting reel further including a shaft extending axially therefrom at each end, the shaft being in frictional engagement with said rings on the drum and said rings supporting the drum on the shaft;
    c) a cutting knife horizontally positioned below the top of the reel; and
    d) a motor to rotate the shaft and the reel and to effect rotation of the drum in the opposite direction as a result of the frictional engagement between the shaft and said rings.

2. The plant processor of claim 1 wherein each of said rings include an O-ring and the shaft includes pulleys each located adjacent an O-ring and having a circumferential groove that receives and frictionally engages a portion of said adjacent O-ring, and wherein the drum is supported on the O-rings.

3. The plant processor of claim 1, further including a drive belt connected to the motor and the shaft for imparting rotation to the reel, hence the drum.

4. The plant processor of claim 2, further including a drive belt connected to the motor and the shaft for imparting rotation to the reel, hence the drum.

5. The plant processor of claim 1, wherein the cutting knife is maintained in position by at least one magnets to enable quick removal and replacement of the cutting knife.

6. The plant processor of claim 2, wherein the cutting knife is maintained in position by at least one magnets to enable quick removal and replacement of the cutting knife.

7. The plant processor of claim 3, wherein the cutting knife is maintained in position by at least one magnets to enable quick removal and replacement of the cutting knife.

8. The plant processor of claim 5, wherein the cutting knife is slidable along a second slot in a frame of the processor by a knife adjusting rod cooperating with the knife.

9. The plant processor of claim 6, wherein the cutting knife is slidable along a second slot in a frame of the processor by a knife adjusting rod cooperating with the knife.

10. The plant processor of claim 7, wherein the cutting knife is slidable along a second slot in a frame of the processor by a knife adjusting rod cooperating with the knife.

11. The plant processor of claim 5, further including a bed bar defining a top surface on which the cutting knife is supported, wherein said magnets are recessed into the bed bar to be flush with the top surface.

12. The plant processor of claim 6, further including a bed bar defining a top surface on which the cutting knife is supported, wherein said magnets are recessed into the bed bar to be flush with the top surface.

13. The plant processor of claim 7, further including a bed bar defining a top surface on which the cutting knife is supported, wherein said magnets are recessed into the bed bar to be flush with the top surface.

* * * * *